United States Patent [19]

Price

[11] Patent Number: 5,248,338
[45] Date of Patent: Sep. 28, 1993

[54] COLORED MARBLED CONCRETE AND METHOD OF PRODUCING SAME

[76] Inventor: Gary Price, 2027 Austin #A-7, Amarillo, Tex. 79109

[21] Appl. No.: 878,540

[22] Filed: May 5, 1992

[51] Int. Cl.$^5$ .............................................. B29C 41/22
[52] U.S. Cl. ...................................... 106/712; 264/73
[58] Field of Search .................. 264/73, 245; 427/268; 106/712

[56] References Cited

U.S. PATENT DOCUMENTS 3,634,179  1/1972  Anderson ................................ 161/19
4,320,078  3/1982  Allen et al. ............................ 264/73

Primary Examiner—Mark L. Bell
Assistant Examiner—Chris Gallo

[57] ABSTRACT

Colored marbled concrete and the process of producing same in a variety of different hues and color or colors by mixing dye into the primary mix, and then adding accent color or colors mixed separately and added gently to the primary mix to create a marble effect.

10 Claims, No Drawings

COLORED MARBLED CONCRETE AND METHOD OF PRODUCING SAME

BACKGROUND OF THE INVENTION

Marbled rock is a product of nature, and has been used by mankind in many ways. And while concrete is a by-product of nature it was invented and perfected by mankind. In ah attempt to beautify this invention (concrete), several methods have provided for dyeing, coloring and painting concrete for use, e.g., in facades, street curbs, sidewalks, water fountains, slabs, pavement blocks, roofing tiles, bridges and similar structures and decorations; this providing color and decor at an economical cost. Although marbled rock is as capable and adaptable for such uses, in most instances it has proven to be cost prohibitive. Therefore it is the purpose of the present invention to provide colored marbled concrete in a multitude of colors and color combinations and the methods of producing same at an economical cost.

PRIOR ART

Prior art reveals several patents in the field of the present invention, some of which are; Jungk, U.S. Pat. No. 4,946,505, Process for Dyeing Concrete. Primary examiner, Lewis T. Jacobs cited the following U.S. Pat. Nos., 20,776; 2,221,175, 3,068,109, 4,162,287, 4,308,073, 4,336,546, 4,366,139, 4,451,231 and the following Foreign Patent Documents; 2,940,156, 4/1980 Fed. Rep. of Germany, 2,450,273 9/1980 France, 149,224 12/1978 Japan, 58-125,759 7/1983 Japan, and 1,537,663. Tanner, U.S. Pat. No. 3,667,976, Colored Cement. Primary examiner, Tobias E. Lovow cited the following U.S. Patent Documents, 3,074,705 and 1,829,082 and the following Foreign Patents; 1,000,124 11/1949 Belgium and 505,406 9/1951 Belgium. Other references cited are; Lea and Desch, "The Chemistry of Cement and Concrete," Edward Arnold & Sons, pp. 76 and 77 (1956). Bowden, U.S. Pat. No. 4,204,876, Cement Coloring Composition And Method of Producing Same. Primary examiner, Brian E. Hearn, cited the following U.S. Pat. Nos., 1,843,420, 2,006,720, 2,442,972, 2,635,057, 2,637,711, 3,117,882, 3,663,284, 3,759,729, 4,062,694, 4,131,480 and 4,137,092. As noted, there are several patents to be found in the Prior Art, most of them relate to dyeing, coloring, and painting concrete. Whereas, the finished product is one solid uniform color, much attention has been given to the accomplishment of these methods. To those familiar in the art, will readily see and appreciate the technology of the present invention, in the summary of the invention, the detailed description of the preferred embodiments, the amended claims and abstract of the disclosure.

SUMMARY OF THE INVENTION

It is an object of the present-invention to provide a colored marbled concrete, for use in home and industry. Another object of the present invention, is to provide the method of producing said colored marbled concrete. Yet another object of this present invention, is to provide a colored marbled concrete, which is economical. A still further object of the present invention, is to provide a colored marbled concrete, whereas the colors of said colored marbled concrete, are versatile and unlimited. Another object of the present invention, is to provide a colored marbled concrete, which can be produced and manufactured in almost any shape, design or size, economically. It is a further object of the present invention, to provide marbleized concrete with a nonporous finish. Yet another object of the present invention, is to provide a colored marbled concrete which has the look of natural marble. A still further object of the present invention, is to provide a colored marbled concrete, whereas the finished surface is eroded, exposing and leaving the aggregate as terrazzo, thereby providing a rustic look.

DESCRIPTION OF PREFERRED EMBODIMENTS

For the purpose of the present invention, concrete is a cement-containing material used for the construction or manufacture of concrete slabs, building foundations, water fountains, bird baths, concrete blocks etc., etc., and is a proven material of construction, which can easily be formed or molded in almost any size or shape. Marble is a hard limestone, capable of taking a beautiful polish, it is also a proven material of construction and is well known throughout the industry to be labor intensive. Therefore, to those familiar in the arts, can and will appreciate the present invention, colored marbled concrete and the method of producing same, as fully described and explained in the examples below. Starting with a mixing vessel, such as a cement mixer or mortar box, sand, cement and water are mixed until it is uniform and homogenous, this stage of mixing is also known as "fines" concrete. The ratio is approximately 3:1 sand to cement mixture. The amount of water used is usually 4 to 5 gallons per sack of cement, depending on the moisture content (the dampness or dryness) of the sand. Concrete, mortar or tile grout dye is then added to the master mix for the desired primary color selected, however, the amount of dye must not exceed the manufacturer's recommendation for the amount of dye used per sack of cement. For larger projects, a cement, sand and pea gravel master mix may be used. The secondary or accent color or colors are mixed in the same proportions and manner, but in smaller batches. When using more than one accent color, each color batch must be mixed separately. The accent colors are always "fines" concrete, regardless of the master mix. At times, white cement may be required for colors, master mixes or accent color mixes. When a pure white color is required a white or clear sand or white marble dust together with white cement is used. This white cement and accent color or colors, is mixed in the same proportions and manner as stated above. The mixed product is poured into prepared molds of the shape and size desired. The colored marbled concrete molds are made from a variety of materials such as, but not limited to, sheet metal, mixed steel, angle iron., steel strap, plywood, fiberglass or plastic. For example: to pour slabs for floors or walls, angle iron would be used to form two sides of the slab or object. These would be bolted or otherwise secured to the mold floor or bottom of the mold. This is usually, but not necessarily, a 4'×8'×¾" sheet of plywood covered with a slick, nonporous covering such as plastic sheeting. The pieces of angle iron would be secured to this frame in the width desired. In between these two pieces of angle iron, and perpendicular to them, would be clamped a ½" or ¼" steel strap of the same height as the angle iron. These steel straps would be placed inside the angle iron to the desired length of the slab. Thus forming the other two sides of the slab form. These molds or forms are lightly oiled for easy separation of mold and product. The prepared colored marbled concrete mix is then poured into the cavity and allowed to dry. Again, this example is just one of many different molds to be used. Where assembly line type products are manufactured in large runs, repeating the same size and shape, reusable type molds will be manufactured from mold materials that are best suited for that particular product or job. After the molds are prepared and oiled, the master mix and accent color mix(es) must be mixed for a minimum of five (5) minutes each. Then each mix is poured from the mixers into smaller hand-held containers which are easily manipulated; a 2½ gallon bucket with a pouring spout is used. Fill the bucket approximately ¾ full with the master mix or dominant color mix, then pour a small amount of the accent color mix (usually about one quart at a time) near the pouring spout. The color and master mix must be stirred very carefully and sparingly, only two of three times, in order to swirl the colors into a marble effect. Great care must be taken to guard against blending the colors into a solid hue, unless this is the desired effect.

The mixture must be poured by moving the bucket around over the mold in a slow, deliberate, continuous forward motion, while holding the bucket very close to the mold. As the colored mikes pour from the bucket,, the hand movement of the bucket will create the desired marbling effect. Pour enough of the product to completely cover the bottom of the mold. This creates a marble effect for the top surface of the product. This "first pour" must be allowed to set until it develops enough body to resist movement when the remainder of the mixture is added. The length of time required for the "first pour" to develop body sufficiently before the final pour will vary according to climatic conditions and the amount of water in the mixture, however, this will only be a few minutes. It is extremely important to guard against movement in the "first pour" design.

As soon as the "first pour," is covering the bottom of the mold, a hand held vibrating sander or any other tool which creates a gentle vibration should be held to the edge of the mold. This step of the process is essential to liberate the surface of air bubbles which may be trapped and would cause a pit in the finished surface. The vibrating will also move the product into all edges and corners of the mold, however, care should be taken not to over vibrate which will cause the colors to blend together and be muted instead of each maintaining its own distinct hue.

The remainder of the mold should be filled by carefully repeating the same motion as in the "first pour" process, this part of the process creates the marble effect on the sides of the piece. During the pour process, additional accent color may be added to complete the pour.

After the final pour, gently vibrate around the outside top of the mold to free any trapped air bubbles from around the edges and allow the mix to flow into all corners and edges. Strike off the top of the mold, which is actually the bottom of the finished piece, and trowel as needed to perfect the piece.

The poured item must set at least 24 hours to dry. After this initial drying time, test the top surface (bottom of piece) with your fingernail or some other small sharp object to make sure the finished piece is hard enough to remove from the mold. Once the mold is removed the object will be placed in a curing atmosphere for at least 5 days.

The final step in this process is to coat the top and sides of the object with a concrete epoxy to protect the surface and color. Additionally, this coating produces a beautiful, strong, glossy, non-porous and long lasting finish.

In addition, and as examples, the finished surface of the product can be finished so as to leave the aggregate exposed, thereby providing a rustic texture and decor to the finished surface. Once this process is complete and the product is cured, the concrete epoxy is applied to protect-the surface and colors. This exposed aggregate textured finish is accomplished in several ways; the first being; after the product mold is prepared, a concrete surface retarder is applied to the bottom of the mold prior to pouring the product mix. Then, after the mixes have been poured and allowed to dry, the product is removed from the mold, turned upside down so the finished (top) product, which was treated with the concrete surface retarder, is facing up. Then, using running water and a stiff bristle brush the cement surface is washed and, brushed away, leaving the exposed aggregate and colored marbled concrete.

Second being; once the product is removed from the mold, the finished (top) surface is turned face up and a solution of 2%–6% muriatic acid is applied to the surface and the-cement is washed and brushed away until the aggregate is exposed for the desired effect.

Third means being; sand blasting the finished (top) surface until the desired exposed aggregate is obtained.

The utility of the foregoing invention is apparent to those of ordinary skill in the art. Although the foregoing specification has set forth this invention in relation to preferred embodiments, other variations, alterations and equivalent formulations and compositions will be apparent to those of ordinary skill. The invention is not intended to be limited in any manner by the foregoing description except as defined by the appended claims.

What is claimed is:

1. A method for producing a colored, marbled concrete, comprising:
   a) obtaining two or more different colored wet concrete compositions, the first being the primary color and the remainder being the accent color or colors:
   b) juxtaposing the concrete compositions in the same container;
   c) stirring the compositions so as to create a swirling pattern with substantially no blending;
   d) pouring swirled mixture into a form;
   e) allowing the concrete to set.

2. The method of claim 1 wherein more than one accent color is used.

3. The method of claim 1 wherein after step (d) mechanical energy in the form of vibration is applied to the molded concrete to liberate trapped air.

4. The method of claim 1 further comprising the step of coating the surface of the marbled concrete with a protective coating.

5. The method of claim 4 wherein the protective coating is concrete epoxy.

6. The colored, marbled concrete made by the method of claim 1.

7. The colored, marbled concrete made by the method of claim 2.

8. The colored, marbled concrete made by the method of claim 3.

9. The colored, marbled concrete made by the method of claim 4.

10. The colored, marbled concrete made by the method of claim 5.

* * * * *